United States Patent
Kudo

(10) Patent No.: US 7,272,080 B2
(45) Date of Patent: Sep. 18, 2007

(54) RECORDING APPARATUS

(75) Inventor: Toshimichi Kudo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/855,372

(22) Filed: May 28, 2004

(65) Prior Publication Data

US 2004/0252593 A1 Dec. 16, 2004

(30) Foreign Application Priority Data

Jun. 10, 2003 (JP) .............................. 2003-165085

(51) Int. Cl.
*G11B 7/085* (2006.01)
*H04N 5/76* (2006.01)

(52) U.S. Cl. ...................... 369/30.09; 386/95; 386/125

(58) Field of Classification Search ............ 369/30.28, 369/47.1, 53.1, 59.1, 30.08, 30.09; 386/124, 386/125, 126, 104, 95, 98; 348/208.4, 208.99; 257/355; 713/193; 380/201; 725/55
See application file for complete search history.

(56) References Cited

U.S. PATENT DOCUMENTS

| 6,501,503 | B2 | 12/2002 | Kudo ..................... 348/208.99 |
| 6,573,930 | B2 | 6/2003 | Kyuma et al. ........... 348/208.5 |
| 6,734,901 | B1 | 5/2004 | Kudo et al. .............. 348/208.4 |
| 7,046,915 | B2 * | 5/2006 | Ando et al. .................... 386/95 |
| 2002/0051408 | A1 | 5/2002 | Kondo ..................... 369/30.05 |
| 2002/0150383 | A1 | 10/2002 | Kato et al. ..................... 386/69 |
| 2003/0227551 | A1 | 12/2003 | Kudo ..................... 348/207.99 |

FOREIGN PATENT DOCUMENTS

| JP | 2002-150503 | 5/2002 |
| JP | 2002-157859 | 5/2002 |

* cited by examiner

*Primary Examiner*—Ali Neyzari
(74) *Attorney, Agent, or Firm*—Fitzpatrick, Cella, Harper & Scinto

(57) ABSTRACT

A recording apparatus of the present invention includes a management information processing portion for generating management information describing a reproducing procedure for reproducing a series of information data by designating positions of from a head to an end of the series of information data recorded during a period of from an instruction of a record start to an instruction of a record stop at the time of a recording operation of moving image data to a recording medium, a playlist processing portion for selecting a part of the series of information data in accordance with a predetermined condition at the time of the recording operation of the information data to generate the series of information data, and a recording portion for recording the management information and the playlist information on the recording medium.

18 Claims, 13 Drawing Sheets

FIG. 3

```
<p1>
<body>
<seq>
<video src='/VIDEO/01000.mpg' ClipBegin='00:00:00:00' ClipEnd='00:15:18:00'
                    tbl= '/01000.tbl'/>
</seq>
</body>
</p1>
```

FIG. 7

```
<p1>
<body>
<seq>
<video src='/VIDEO/01000.mpg ClipBegin='00:00:02:10' ClipEnd='00:02:40:20'
                               tbl='/01000.tbl'/>
<video src='/VIDEO/02000.mpg ClipBegin='00:03:01:25' ClipEnd='00:06:04:12'
                               tbl='/02000.tbl'/>
<video src='/VIDEO/01000.mpg ClipBegin='00:06:20:00' ClipEnd='00:10:11:10'
                               tbl='/01000.tbl'/>
<video src='/VIDEO/03000.mpg ClipBegin='00:05:03:05' ClipEnd='00:12:22:08'
                               tbl='/03000.tbl'/>
</seq>
</body>
</p1>
```

FIG. 10

```
<p1>
<head>
<meta name="vpl_auto"content="1"/>
</head>
<body>
<seq>
<video src='/VIDEO/01000.mpg ClipBegin='00:00:02:10' ClipEnd='00:02:40:20' tbl='/01000.tbl'/>

<video src='/VIDEO/01000.mpg ClipBegin='00:03:01:25' ClipEnd='00:06:04:12' tbl='/01000.tbl'/>

<video src='/VIDEO/01000.mpg ClipBegin='00:06:15:00' ClipEnd='00:09:16:10' tbl='/01000.tbl'/>

<video src='/VIDEO/01000.mpg ClipBegin='00:10:03:05' ClipEnd='00:14:00:08' tbl='/01000.tbl'/>

<video src='/VIDEO/01000.mpg ClipBegin='00:14:30:00' ClipEnd='00:15:18:00' tbl='/01000.tbl'/>

</seq>
</body>
</p1>
```

RECORDING APPARATUS

BACKGROUND OF THE INVENTION

1. Field of the Invention

The present invention relates to a recording apparatus, and more particularly to the processing of information for controlling a reproduction procedure of information data.

2. Description of Related Art

Now, the capacity of recording media such as a memory card to be used in a digital camera and an optical disk to be used in a digital video camera have been remarkably increased to be able to record various kinds of data with respect to moving images, audios and still images, and products using such memory cards and optical disks as recording media have increased. Moreover, such products has a feature of an editing function of re-arranging recorded contents or combining them by utilizing their random access properties, which video tapes can not attain.

The editing functions include a deleting function for deleting unnecessary contents, a partially deleting function for assigning unnecessary parts of contents to delete the assigned parts from the contents, a function for actually editing content data such as the division of contents and the combination of the contents. Moreover, there is also a method for recording reproduction control, information such as a reproduction procedure and a layout, and for reading data in accordance with the reproduction control information at the time of reproduction to reproduce the data. The method is an editing function called as a playlist generally.

Japanese Patent Application Laid-Open No. 2002-150503 (corresponding to U.S. patent application No. AA 2002051408) discloses an apparatus which detects an area which is not assigned by a playlist to delete the area simply.

Moreover, an article "What Blue-Disc Aims" (Nikkei Electronics 2003, 3-31 (No. 844)) and Japanese Patent Application Laid-Open No. 2002-157859 (corresponding to U.S. patent application No. AA 2002150383) disclose a managing method for producing a Real PlayList to all of the contents to be recorded and for rewriting the entries in the Real PlayList when the editing of the recorded content data (Clips) such as the classification thereof and the synthesis thereof is performed. Moreover, the method sets as a Virtual PlayList the above-mentioned playlist, or reproduction control information for an arrangement of arbitrary parts of the content data, which part a user recognizes as a work.

According to the method disclosed in Japanese Patent Application Laid-Open No. 2002-150503, all of the data which is not selected in the playlist is deleted when unnecessary parts of contents are deleted. That is, because all of the data which is not assigned in the playlist is deleted according to the method, even if necessary data is included in the data which is not assigned in the playlist, all of such necessary data is also deleted.

On the other hand, it seems that such a defect is apparently removed by assigning all of the data in the Real PlayList as shown in Japanese Patent Application Laid-Open No. 2002-157859. However, for deleting unnecessary data, a user is required to assign the parts to be deleted.

SUMMARY OF THE INVENTION

It is an object of the present invention to solve the aforesaid problems.

It is another object of the present invention to enable a user to identify a part which is seemed to be unnecessary, by a simple operation to delete the identified part.

For achieving such objects, according to an embodiment of the present invention, a recording apparatus for recording information data on a recording medium comprises: instruction means for instructing a start and a stop of recording; management information processing means for generating management information describing a reproducing procedure for reproducing a series of information data by designating positions of from a head to an end of the series of information data recorded on the recording medium during a period of from an instruction of a record start to an instruction of a record stop by the instruction means at time of a recording operation of the information data; playlist processing means for selecting a part of the series of information data in accordance with a predetermined condition at the time of the record operation of the information data to generate playlist information describing a reproducing procedure for reproducing the part of the information data; and recording means for recording the management information and the playlist information on the recording medium.

The objects other than the above-said objects and the features of the present invention will be apparent from the following detailed descriptions of the aspects of the invention with reference to the attached drawings.

BRIEF DESCRIPTION OF THE DRAWINGS

FIG. 3 is a view showing a state of image data;

FIG. 7 is a view showing a state of a playlist;

FIG. 10 is a view showing a state of a playlist;

DESCRIPTION OF THE PREFERRED EMBODIMENTS

The preferred embodiments of the present invention are described.

Figure 1:
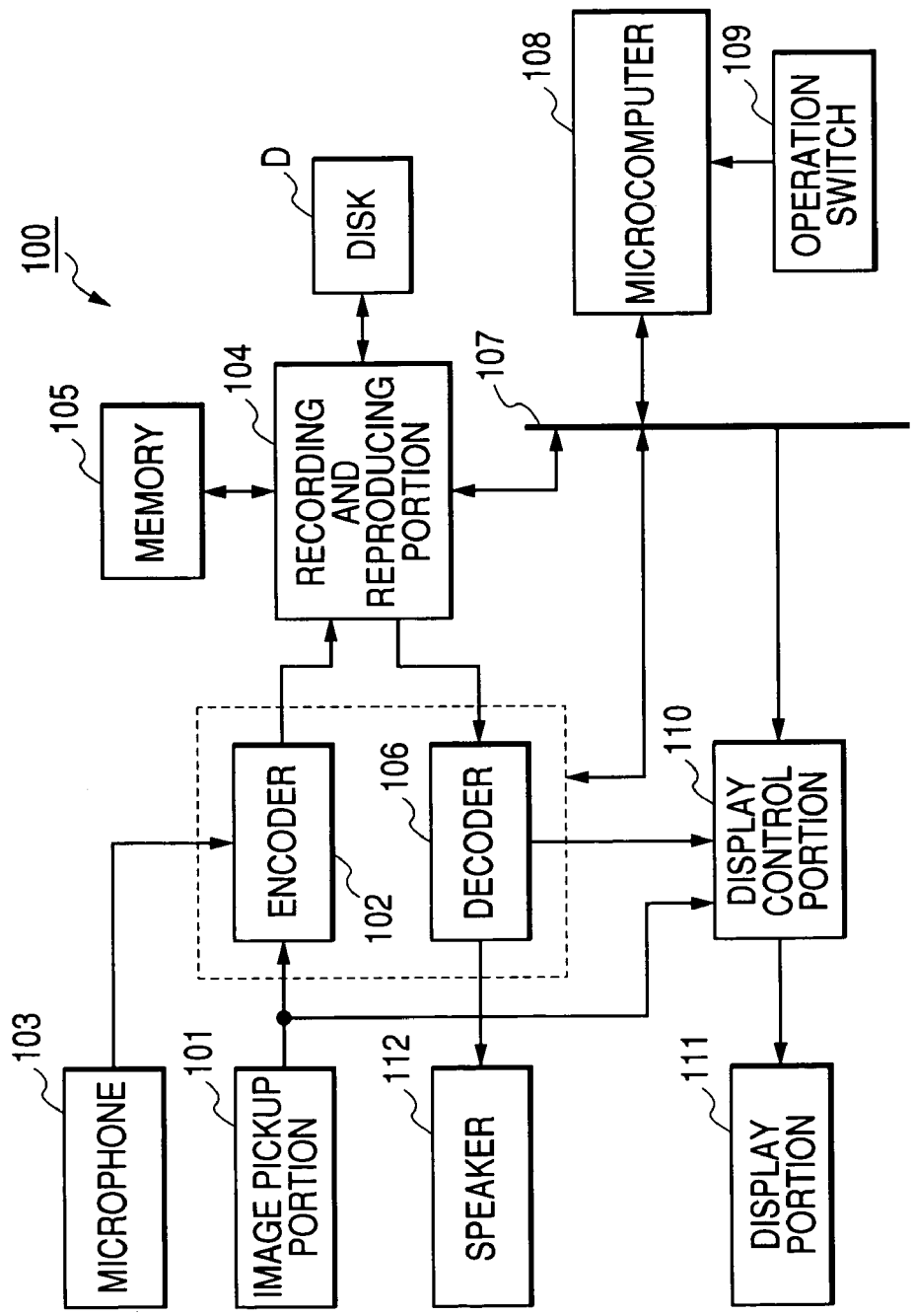
FIG. 1 is a view showing the configuration of a vide camera to which the present invention is applied.

FIG. 1 is a view showing the configuration of a video camera 100 to which the present invention is applied.

In FIG. 1, a reference numeral 101 denotes an image pickup portion including a lens unit, a CCD, an A/D converter and the like. The image pickup portion 101 outputs an object image as digital image signals. A reference numeral 103 denotes a microphone unit for outputting digital audio signals at a time of photographing.

A reference numeral 102 denotes an encoder. The encoder 102 receives digital image data and digital audio data in accordance with the control of a microcomputer 108, and compresses the received data in accordance with an MPEG 2 system. The encoder 102 further performs the multiplexing of the compressed data in the order of time series to generate-compressed video data. Furthermore, the encoder 102 also has a function of performing the compression of a JPEG system to output compressed still image data. Moreover, the encoder 102 also has a function of informing the microcomputer 108 of the information necessary for the conversions of data positions and frame positions, and the like.

A reference numeral 104 denotes a recording and reproducing portion. The recording and reproducing portion 104 includes respective interfaces to the encoder 102, a memory 105, an optical disk D and a decoder 106, and performs the recording and the reproducing of data onto the disk D in accordance with the control of the microcomputer 108. The reference numeral 106 denotes the memory. Each block of the memory 106 can be used for a work.

The recording and reproducing portion 104 performs a conversion for the access of the microcomputer 108 to a control register of the disk D. Moreover, the recording and reproducing portion 104 has a mechanical deck including a head and a motor, and a control circuit for controlling the mechanical deck. Moreover, the recording and reproducing portion 104 is provided with the so-called direct memory access (DMA) function for transferring read data or written data automatically by designating the starting address of the memory 105, the amount of data and the head selector of writing in the disk D.

The reference numeral 106 denotes the decoder. The decoder 106 sequentially reads compressed video data and compressed still image data from addresses of the memory 105 designated by the microcomputer 108 to convert the read data into digital image signals and digital audio signals in accordance with ITU-RBT 656 (CCIR 656) or the like. Then, the decoder 106 outputs the converted data.

The reference numeral 108 denotes the microcomputer for controlling the whole system. The microcomputer 108 includes at least a nonvolatile memory (ROM) for storing programs, a volatile memory (RAM) to be used as a work area, external buses for performing data passing with other hardware and for accessing a controlling register, and a timer for measuring time. Moreover, the microcomputer 108 includes a real-time clock to be used for obtaining a calendar to be utilized as time stamp information to be given to the data to be recorded. A reference numeral 107 denotes a bus. Each block is connected to the bus 107, and performs data passing through the bus 107 in accordance with the control of the microcomputer 108.

A reference numeral 109 denotes a switch group. The switch group 109 is an input portion for a user to designate the supply of electric power, the selection of recording and reproducing, a recording mode for determining image quality, and the like.

A reference numeral 110 denotes a display control portion. The display control portion 110 produces information such as various designation menus, titles and time, and outputs the produced information to the display portion 111 together with the image data from the decoder 106 and the image data from the image pickup portion 101. Moreover, the display control portion 110 extracts the image data input from the decoder 106 to perform a reduction process of the extracted image data to superpose the reduced image data at an arbitrary position.

A reference numeral 112 denotes a speaker, and the reference numeral 111 denotes the display portion.

The microcomputer 108 installs software thereon for dealing with a predetermined file system, and performs the reading and the writing of data onto the disk D in accordance with the file system. Moreover, in the present embodiment, the microcomputer 108 manages as one content (or a file) data to be recorded during a period of from an instruction of starting recording to an instruction of stopping the recording, and this content corresponds to a moving image file which will be described later.

Next, the operation of the embodiment at the time of recording is described.

First, when electric power is supplied, the microcomputer 108 controls the recording and reproducing portion 104 in accordance with the file system to search a recordable (vacant) area of the disk D. Then, the microcomputer 108 calculates a recordable capacity, and calculates a recordable time on the basis of the recordable capacity and a recording mode (an image quality mode) designated by a user. After that, the microcomputer 108 monitors a decrease of the recordable capacity during recording, and periodically updates the recordable time.

The microcomputer 108 always detects the state of the operation switch 109 to monitor the operation of the user. In the following, it is supposed that the operation of the user is transmitted to the microcomputer 108 through the operation switch 109 unless otherwise noted.

Next, when the user generates a record starting requirement, the microcomputer 108 controls each block to start the recording of a camera image and a audio. First, the microcomputer 108 controls the encoder 102 to start the encoding process in accordance with MPEG 2 and store compressed video data into a predetermined address of the memory 105 as the starting address through the recording and reproducing portion 104. The encoder 102 informs the microcomputer 108 of every storage of a predetermined amount of data by means of an interruption or the like. The microcomputer 108 receives the information and to inform the recording and reproducing portion 104 of the starting address of the next storage.

Furthermore, the microcomputer 108 issues a command for writing the compressed video data stored in the memory 105 onto the disk D. The area of the disk D in which the video data is to be written is the recordable (vacant) area searched in accordance with the file system. The microcomputer 108 repeats a series of process of from the encoding process to the writing process into the disk D until an occurrence of a requirement of a stop of recording. The entry of the recorded compressed video data into the file system is performed as a moving image data file (having an extension of "mpg"), which will be described later. Moreover, the microcomputer 108 generates a management file (having an extension of "rpl") including management information designating the data stored in the disk D at the time of the recording operation. Furthermore, the microcomputer 108 generates a time map table (having an extension of "tbl") necessary for a special reproduction, playlists, editing and the like, and describes the generated time map table.

Next, the reproduction operation is described.

A user selects contents which the user wants to reproduce, by operating the operation switch 109.

The microcomputer 108 controls the recording and reproducing portion 104 in accordance with the instruction of the user to reproduce the management information of the disk D indicating each stored content and the representative image (as a thumbnail) related to the content from the disk D. Then, the microcomputer 108 instructs the display control portion 110 to generate a screen for the selection of contents on the basis of the data.

Generally, the user follows a sequence to start the reproduction by moving;the pointer to a desired content and determining it. Alternatively, a reproduction key (or a key allocated for an issue of a reproduction command) may be adopted to be depressed to reproduce a configuration for reproducing, for example, a leading content, a continuation from the content produced at the preceding time, the content recorded last, and the like.

The microcomputer 108 controls the recording and reproducing portion 104 to read the compressed video data of the content determined as above from the disk D. Then, the microcomputer 108 issues a command for storing the data read from the disk D into the memory 105 to the recording and reproducing portion 104. At this time, the microcomputer 108 designates a read starting sector of the disk D, a write starting address of the memory 105 and the amount of data. Next, the microcomputer 108 issues a command to the decoder 106 to perform the decode process of the compressed video data stored in the memory 105. The microcomputer 108 executes the series of processes repeatedly so that the compressed video data to be decoded should be not broken off to the decoder 106, until the content has ended or until a user operation of a stop, a temporary stop or the like is given.

The data to be dealt with in the present embodiment is described.

First, the details of the kinds of data to be recorded by the video camera, a directory structure to be stored, a management file, a time map table and a playlist will be described in order.

Incidentally, although no descriptions are given to still image data in the present embodiment, since the still image data, adopts a JPEG system, directory names, file names and the like of the still image data may be recorded in accordance with a regulation based on a Design rule for Camera File system (DCF standard).

Figure 2:
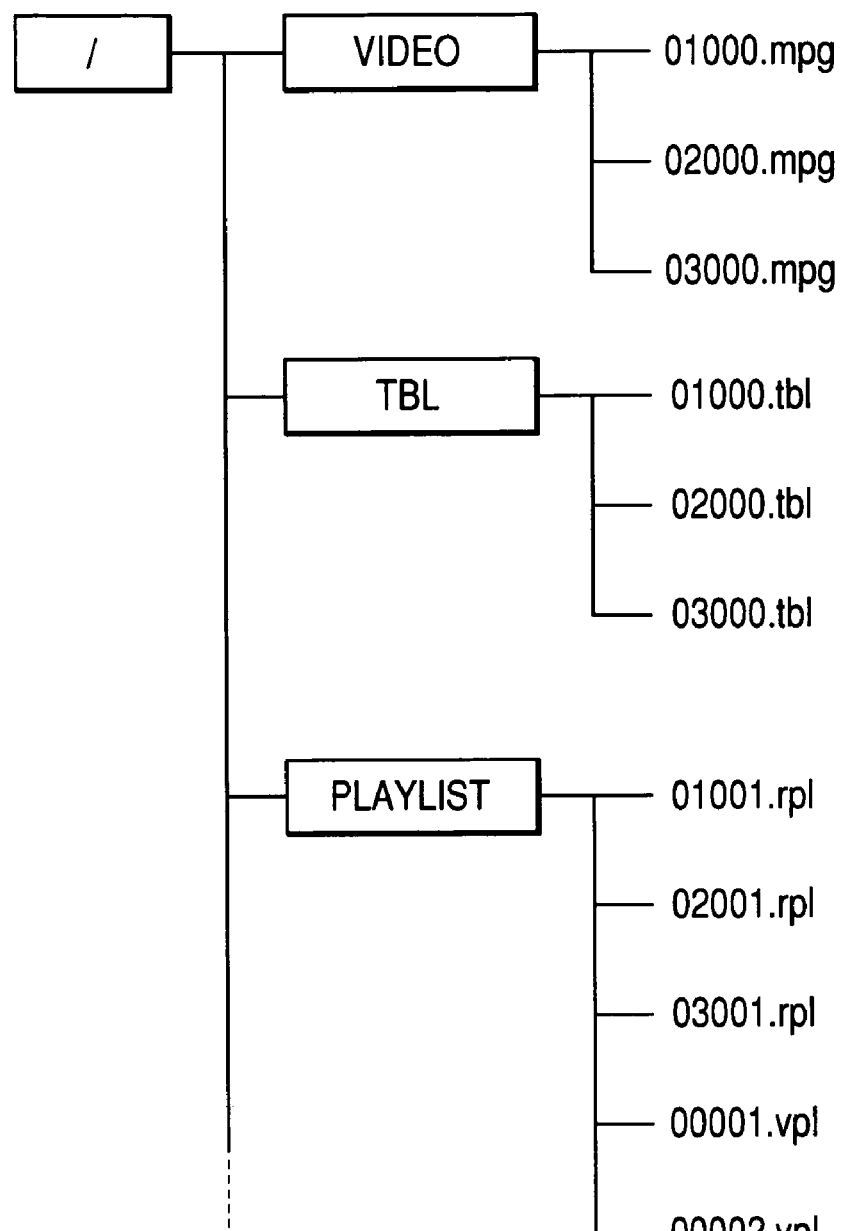
FIG. 2 is a view showing a state of files to be stored on a disk.

FIG. 2 shows an example of a state in which moving data files, management files and playlist files are stored in a recording medium. The files having the extension of ".rpl" are management files. The files having the extension of ".tbl" are time map table files. The files having the extension of ".vpl" are playlist files.

The moving data files are stored in a VIDEO directory made immediately below the root directory of the recording medium. It is supposed that the file names of the moving data files are given in a form in which two higher order digits increases and that the extensions of the moving data files are ".mpg". The management files and the playlist files are made in PLAYLIST directory.

The management files are supposed to be made in the same syntax format as that of the playlists, which will be described later. The management files are called as Real PlayLists in the following. The Real PlayLists is described with a format complying with extensible Markup Language (XML) drawn up at World Wide Web Consortium (W3C).

FIG. 3 shows an example of a description of a Real PlayList. The description is almost similar to that of Synchronized Multimedia Integration Language (SMIL), but the tbl attribute of a video tag assigns a time map table file corresponding to the moving image data file designated by the src attribute. The time map table file will be described later in detail. Moreover, a ClipBegin attribute and a ClipEnd attribute assign a head position and an end position of a content, respectively, on the frame basis. In the following, the information referred to or designated by a video tag is called as a PlayItem.

Figure 4A:
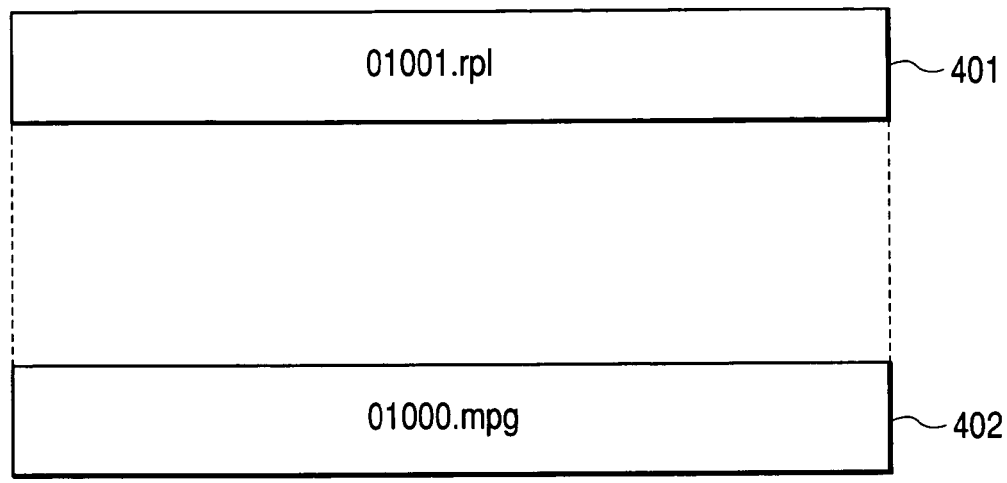
FIGS. 4A and 4B are views showing relations between management files and image data.
Figure 4B:
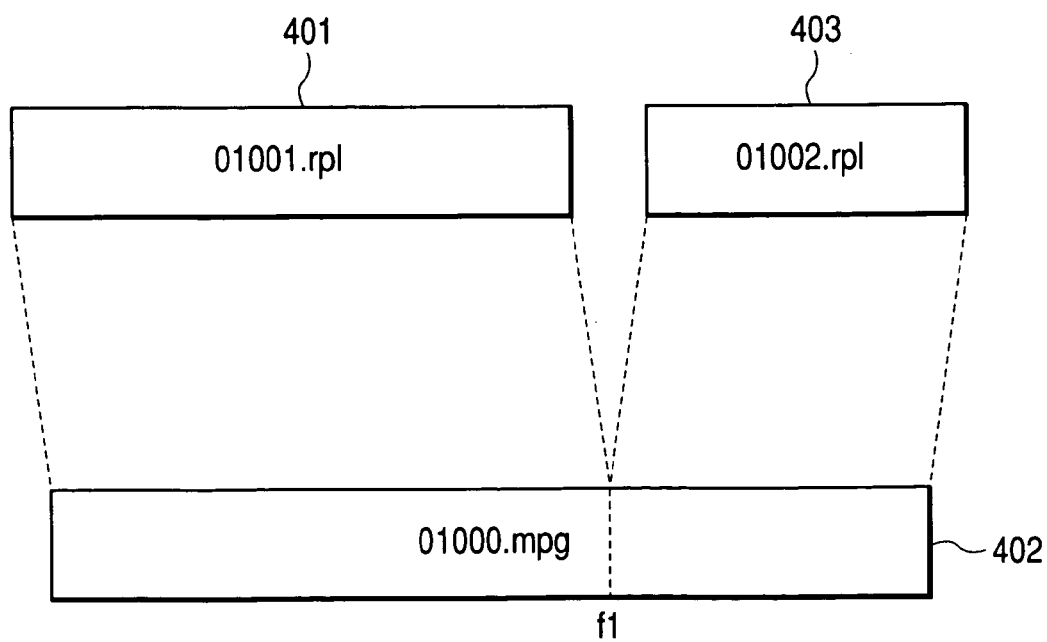

The Real PlayList is produced together with a moving image file. The two higher order digits of the file names of the Real PlayList and the moving image file coincide with each other. It is supposed that a moving image data file 01000.mpg and a management file 01001.rpl are recorded as shown in FIG. 4A, and that an operation for dividing the moving image data file 01000.mpg at an arbitrary position f1 has been done. In this case, the content of the management file 01001.rpl is changed to assign the positions of from the head to the f1 position, and a management file 01002.rpl is newly produced to be a Real PlayList assigning the positions of from the f1 position to the end, as shown in FIG. 4B.

The lower three digits in the five digits of a file name are used as described above. By using such Real PlayLists, a user is enabled to see as if the content is divided into two contents.

Moreover, the Real PlayLists do not assign the same area doubly, and the areas which are not assigned by the Real PlayLists are not reproduced.

Next, a time map table is described.

Figure 5:
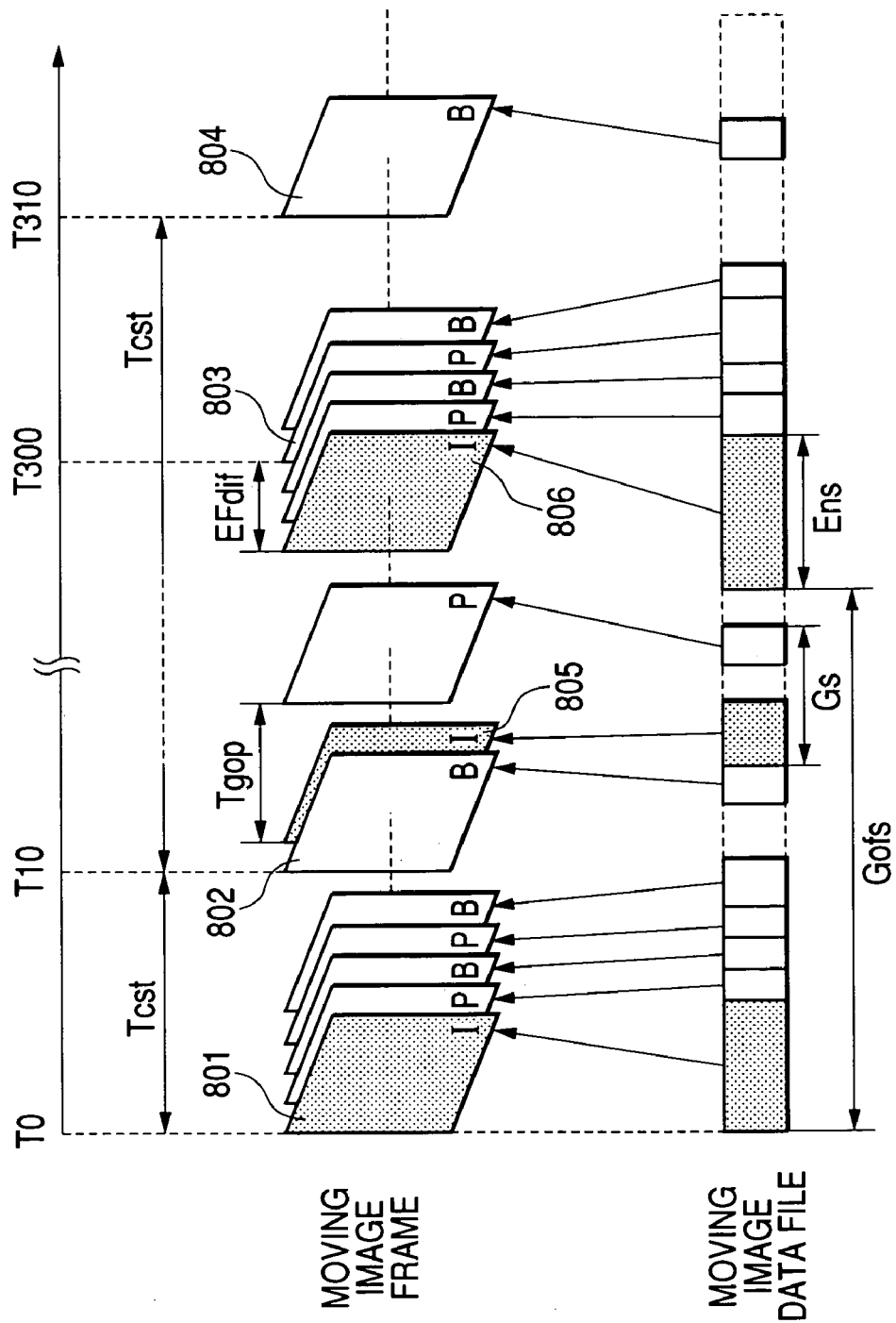
FIG. 5 is a view for illustrating a time map table.
Figure 6:
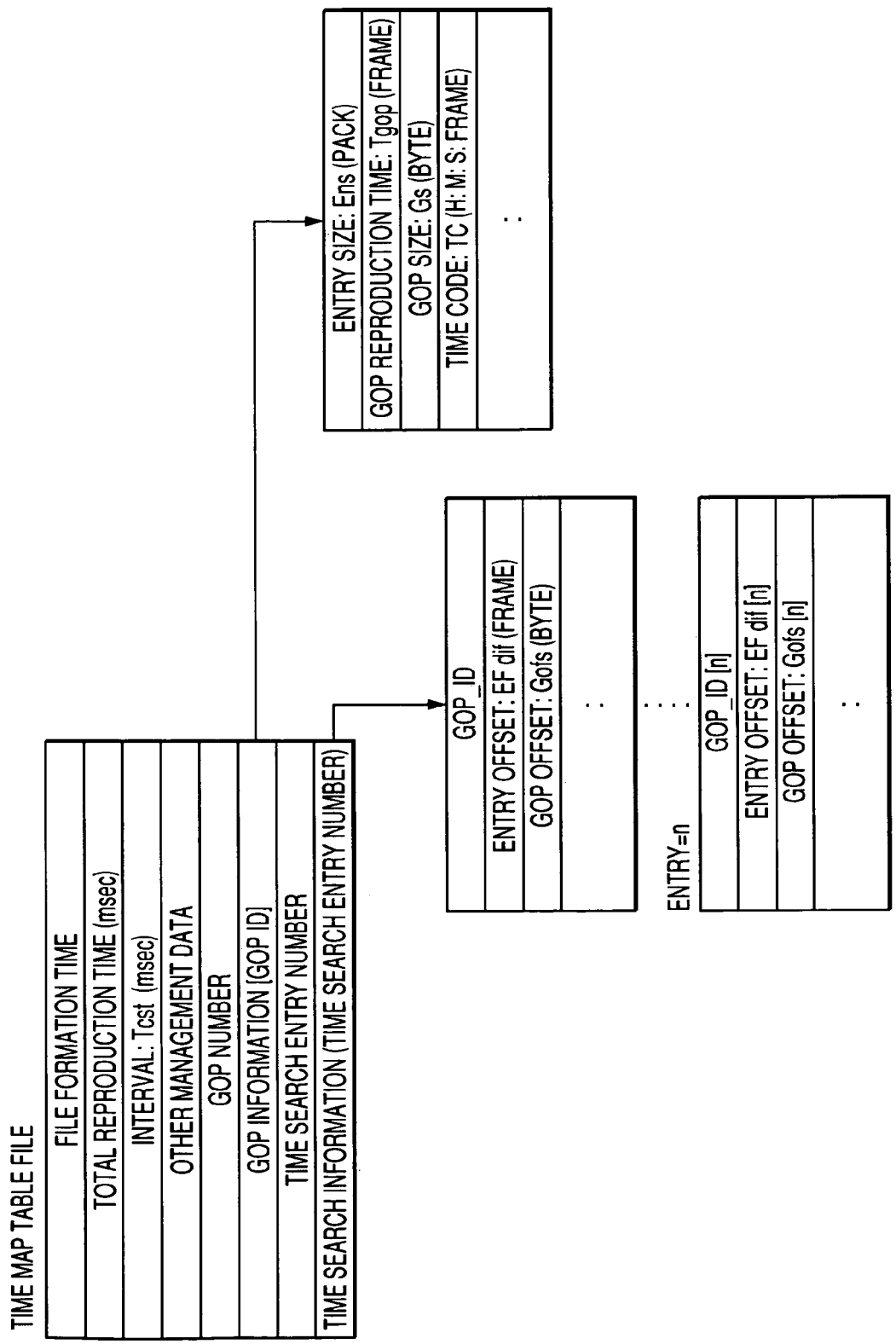
FIG. 6 is a view showing a state of a time map table.

FIG. 5 is a view in which moving image frames and moving image data files are imaged for illustrating a time map table. FIG. 6 is a view showing the data structure of a time map table file.

The MPEG 2 system is a movement compensation type prediction coding system for coding data by using a correlation between images to compress the amount of information. An I picture is an image to be intra-frame coded. A P picture is an image to be coded in accordance with the prediction inter-frame coding using a past frame. Moreover, a B picture is the image data of each frame between an I picture and a P picture and between P pictures. The B picture is an image to be coded by the bidirectional prediction coding using the image data of past frames and future frames. In FIG. 5, each picture is denoted by letters I, P and B, respectively. In MPEG 2, a predetermined number of frames constitutes a group of pictures (GOP). At least one frame of I picture is included in each GOP. The inclusion of at least one I picture in each GOP heightens the random access property of the system, and makes it easy to perform editing at a predetermined level.

In FIG. 5, marks T0, T10, T300 and T310 denote time. A mark Tcst denotes interval time, which is an interval for producing a time search entry described later. Reference numerals 801-804 denote a time search frame in each interval time Tcst. A mark Tgop denotes GOP reproducing time, and a mark Gs denotes the size of a GOP. A mark TC denotes the time code of a starting frame of a GOP. The time code herein corresponds to a frame number from the head of each content, to be defined at the time of recording. Consequently, when a partial deletion is performed on the GOP basis, the time code becomes discontinuous before and after the deleted GOP. Unique identification data GOP_ID is given to each GOP, and the reproducing time Tgop and the size Gs are recorded with respect to each identification data GOP_ID.

Each time search entry includes the following information: the identification data GOP_ID including a time search entry frame corresponding to the time search entry, an offset Efdif from the entry frame to a time search entry frame, and an offset Gofs from the head to the entry frame. The entry frame means the starting frame necessary for decoding each time search entry to generate image data. As described above, MPEG includes the B pictures and the P pictures. The B pictures and the P pictures are coded by means of the correlation with the frame of the I picture, or with each of the frames of I and P pictures. Consequently, when the time search entries are the B and P pictures, the I picture or the P picture is necessary for decoding the image, and the entry frames correspond to those frames. When the time search entry is one frame, the frame itself is the entry frame, and the offset Efdif is zero. FIG. 5 shows the case of the time search entry frame 801.

These information have a structure shown in FIG. 6, and are included in a time map table file (having the extension of ".tbl").

A method of restoring the time search entry frame 803 at the time T300 on the basis of the time map data table is described as an example. Because the time search entry is included in each time interval Tcst, the time search entry frame 803 is the nth entry when the n is supposed to be: n=T300/Tcst. Consequently, the identification data GOP_ID as the time search information [n] is obtained. A byte count from the head to the entry frame 806 can be known on the basis of the offset Gofs [n] as a member of the identification data GOP_ID. Moreover, how many frames exist from the entry frame 806 to the time search entry frame 803 can be known from the offset Efdif [n]. Consequently, the time search entry frame 803 at the time T300 can be reproduced by starting decoding at Gofs [n]-th byte from the head and displaying the frame at the offset Efdif [n]. Thereby, it becomes easy to perform the retrieval on the frame basis.

On the other hand, when frames are designated by time codes, the identification data GOP_ID [m] in the vicinity of a desired frame is specified by the search of the time code TC, and at the same time the offset of the identification data GOP_ID [m] is calculated by summing up the sizes Gs to the identification data GOP_ID [m]. Moreover, by reproducing the frame ahead by the time code TC, it becomes possible to designate an unchangeable frame.

According to the method described above, it becomes possible to specify a frame by means of the relative time from the head of a content, and to specify a frame by means of the absolute time (time code).

Incidentally, the time map table described hereupon is reconstructed, for example, when a partial deletion is performed. Incidentally, the partial deletion is not performed to a smaller group of pictures than the GOP. Furthermore, the time code TC is not changed.

Moreover, although the moving images are exemplified hereupon, actually the information such as audio data and pack headers are incorporated with the moving images, and the table is actually made up by taking into consideration such information.

Next, a playlist is described.

As described above, a playlist is also described in a format complying with XML similarly to the Real PlayList (management file). The playlist is reproduction control information produced by a user's operation basically. The playlist is called as a Virtual PlayList to the Real PlayList.

FIG. 7 shows a description example of a playlist.

The format is similar to that of the Real PlayList. Incidentally, the file names have no relation to the names of the moving data files. Moreover, even when the playlist is edited, the editing of the moving data files and the Real PlayLists is not performed. In FIG. 7, the moving image data described after a tag seq is sequentially reproduced.

Originally, a management file is produced at the time of the recording of moving image data or the like, and the playlist is a function for enabling a user to designate freely a reference area and edit without working the recorded moving image data directly. However, the present embodiment is characterize in that the management file and the playlist are dealt with as follows.

That is, the present embodiment selects data in accordance with a predetermined condition together with a moving image data file and the Real PlayList, and automatically produces a Virtual PlayList in which a reproducing procedure of the data is assigned.

Figure 8:
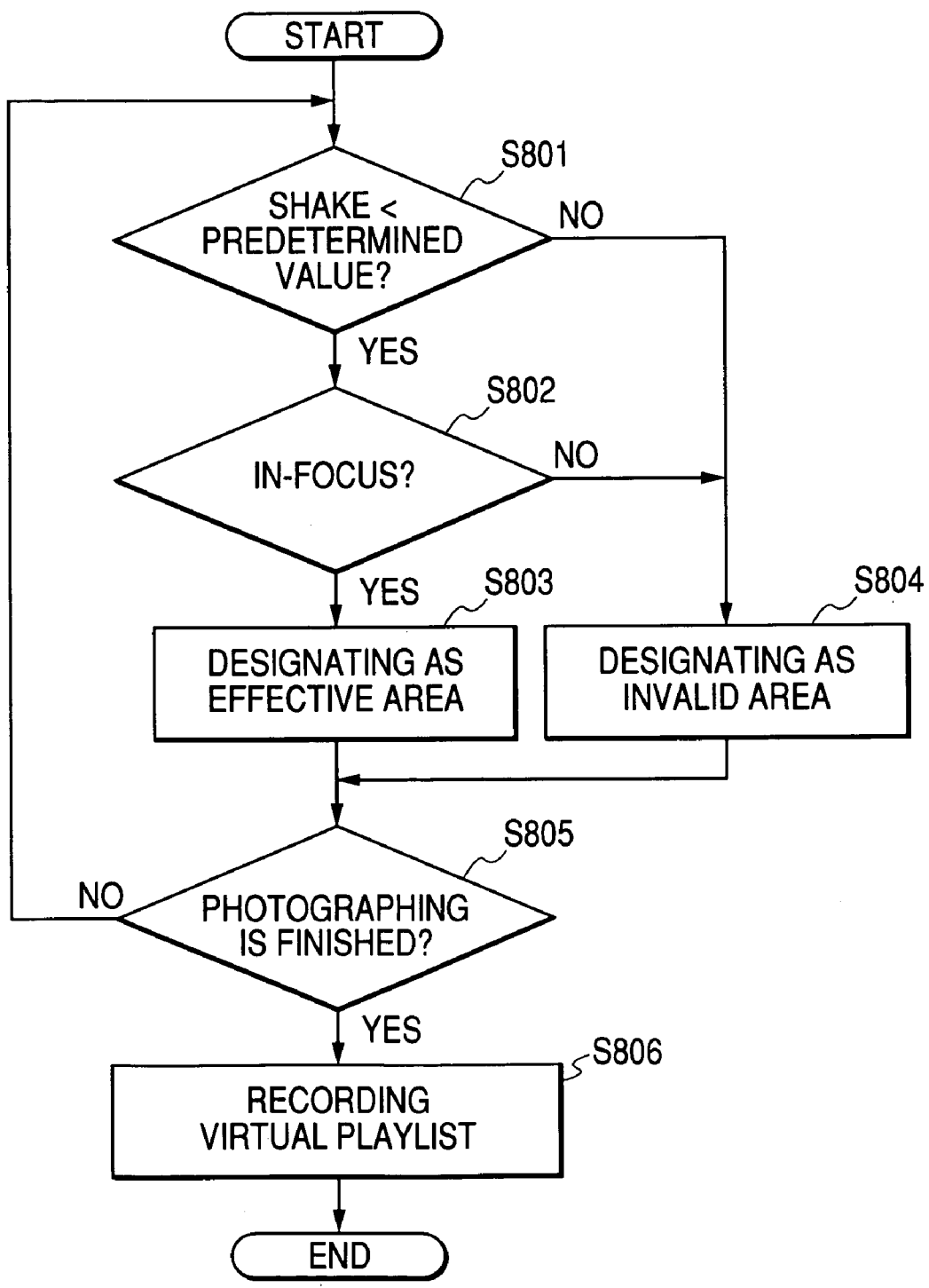
FIG. 8 is a flowchart showing a process at a time of recording.

Next, a condition for selecting the reproducing data assigned by the Virtual PlayList in such a way is described with reference to FIG. 8. FIG. 8 is a flowchart showing an automatic reproducing process of the Virtual PlayList to be executed by the microcomputer 108 at the time of photographing a moving image.

When photographing is started, it is judged whether displacements owing to camera-shakes are smaller than a predetermined value or not (step S801). The present embodiment is equipped with a camera-shake correction function, which is installed in many video cameras at present, and the judgment is performed on the information to be used at the time of the camera-shake correction.

When the displacements owing to the camera-shakes are smaller than the predetermined value, it is judged whether an object is in in-focus or not (step S802). In the present embodiment, the judgment is performed on the information of an automatic focusing function installed in a video camera generally.

When the results of the judgments at both the steps S801 and S802 are yes, namely when the camera-shakes are smaller than the predetermined value and when the camera is in in-focus, the data which is photographed now is designated as an effective area (step S803).

On the other hand, when the result of the judgment at either the step S801 or the step S802 is no, namely when the camera-shakes are larger than the predetermined value or when the camera is out of focus, the data which is photographed now is designated as an invalid area (step S804).

Then, it is judged whether the termination of the photographing is instructed or not (step S805). The processes of the steps S801-S804 are repeatedly executed until the instruction of the termination of the photographing is issued. In the present embodiment, the processes are repeatedly executed every predetermined interval (for example, every one frame period).

When the instruction of the termination of the photographing is issued, a Virtual PlayList in which the reproducing procedure is assigned to reproduce only the data in the effective area set at the step S803 is produced on the basis of the information of the effective area, and the Virtual PlayList is recorded on the disk D by the recording and reproducing portion 104. At this time, it is preferable to remove only the areas which have been designated as the invalid area continuously for a predetermined period from the Virtual PlayList.

Figure 9:
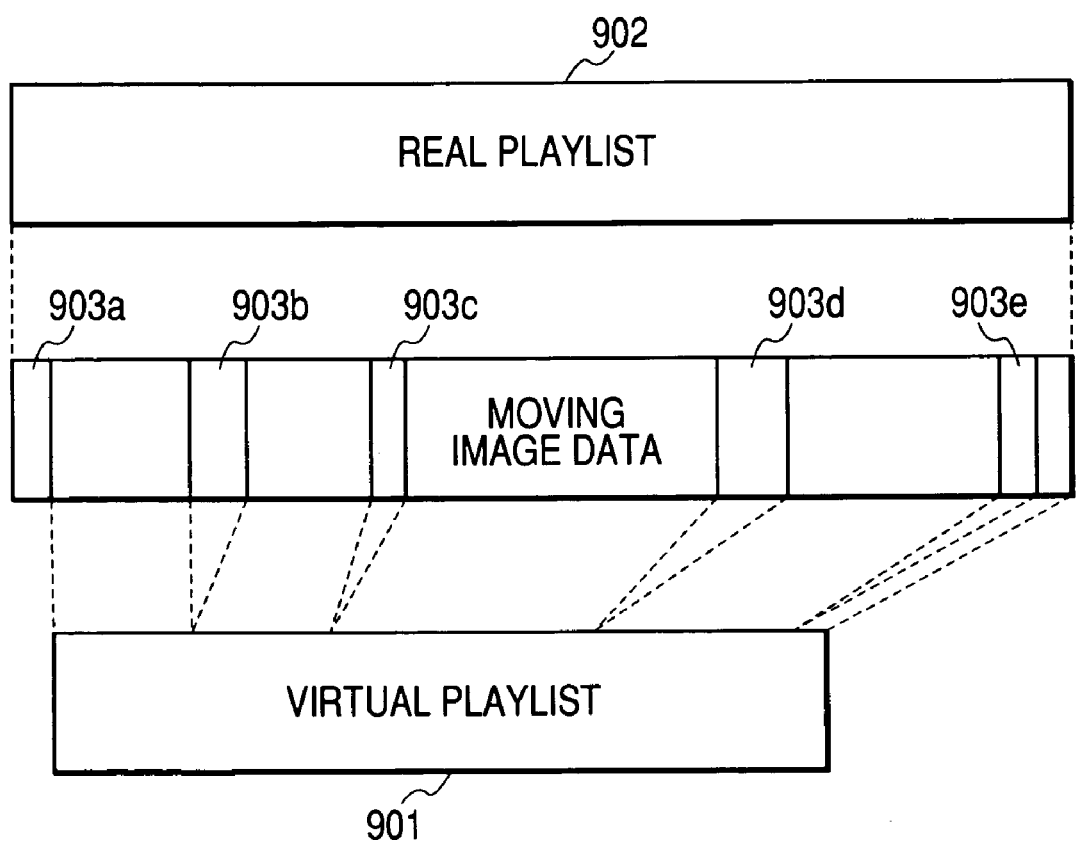
FIG. 9 is a view showing a relation among a management file, image data and the image data.

FIG. 9 shows a relation among the moving image data, the Real PlayList and the Vitual PlayList, which are recorded in the manner described above. In FIG. 9, a reference numeral 901 denotes the Virtual PlayList. A reference numeral 902 denotes the Real PlayList. A reference numeral 903 denotes the moving image data. Areas 903a-903e in the moving image data 903 are parts designated as the invalid area in the process shown in the flowchart of. FIG. 8. As shown in FIG. 9, the Real PlayList 902 assigns the whole area of the moving image data 903. The Virtual PlayList 901 is a playlist assigning the area produced by removing the areas 903a-903e from the whole area of the moving image data 903.

FIG. 10 shows a description example of the Virtual PlayList at this time.

The Virtual PlayList is characterized by a meta tag included in a head tag. In case of an automatically produced Virtual PlayList, the meta tag having the name attribute value of "vpl_auto" and the content attribute value of "1" is described. When the meta tag including these attributes exists, the Virtual PlayList can be known as one produced automatically. Moreover, when there is no meta tags having such attributes or when a meta tag having the content attribute value of "0" exists, the Virtual PlayList is one produced by an operation of a user. The system or the user can identify the automatically produced Virtual PlayList on the basis of the information.

In such a way, at the time of photographing a moving image, the present embodiment records a Real PlayList designating the whole recorded image data and a Virtual PlayList designating only the effective areas of the image data on the basis of the situation at the time of the photographing.

Next, a process at the time of editing the Real PlayList and the moving image data by means of the Virtual Play List, which are recorded in such a manner, is described.

Figure 11:
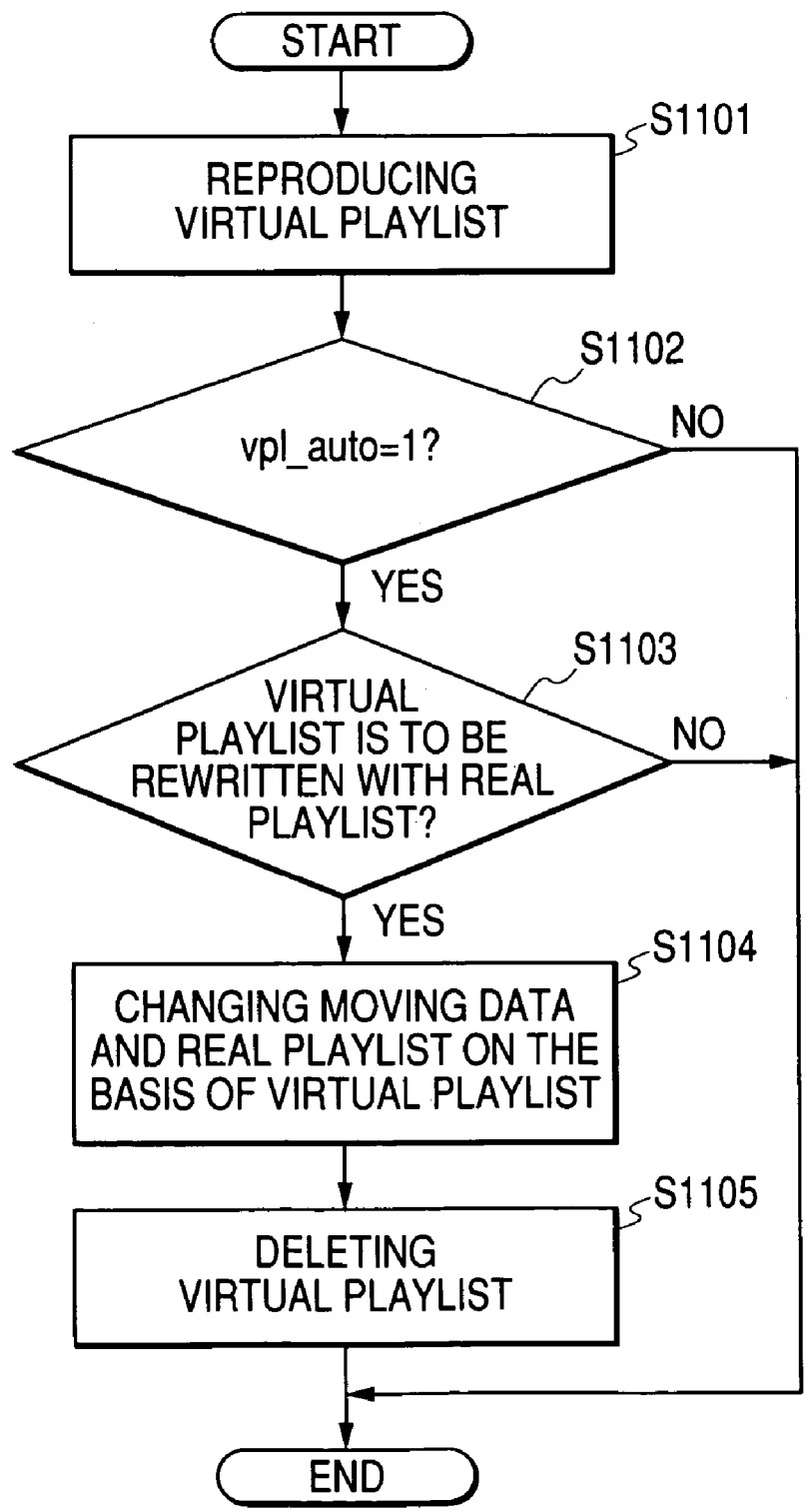
FIG. 11 is a flowchart showing an editing process.

FIG. 11 is a flowchart for illustrating a process to be executed by the microcomputer 108 when image data is reproduced on the Virtual PlayList.

When a reproduction instruction is input from the operation switch 109, the microcomputer 108 controls the recording and reproducing portion 104 to reproduce the Virtual PlayList of the assigned moving image data from the disk D (step S1101). Hereupon, the display control portion 110 displays a list or thumbnail images of the Virtual PlayList on the display portion 111, and a user selects desired image data among them.

Next, it is judged whether the vpl_auto attribute value is "1" or not as the meta tag in the read Virtual PlayList (step S1102). That is, it is judged whether the selected Virtual PlayList is one produced automatically or not. When the selected Virtual PlayList is not the one produced automatically, the Virtual PlyaList is ordinal one, i.e. the Virtual PlayList which the user has produced by himself or by herself. Accordingly, the process is ended.

Moreover, when the Virtual PlayList is one produced automatically at the time of photographing, the microcomputer 108 controls the display control portion 110 to display a dialog for inquiring on the display portion 111. Thereby, the microcomputer 108 inquires the user whether the user performs the editing of the Real PlayList and the moving image data file, on the bases of the reproduction area assigned by the Virtual PlayList (step S1103).

When an instruction of rewriting is input from the operation switch 109 at the step S1103, the microcomputer 108 controls the recording and reproducing portion 104 to rewrite the Real PlayList corresponding to the PlayItem indicated by the Virtual PlayList. To put it concretely, the microcomputer 108 rewrites the Real PlayList so as to assign the same areas as the areas assigned by the Virtual PlayList. Thereby, the parts which are not assigned by the Virtual PlayList are not assigned also by the Real PlayList, and the image data at the parts which are not substantially assigned is deleted from the disk D.

When the rewriting process of the Real PlayList and the editing process of the moving image file have been completed, the data already assigned by the Real PlayList and the data assigned by the Virtual PlayList become the same. Accordingly, the Virtual PlayList is deleted (step S105).

Then, after the rewriting of the Real PlayList in such a manner, the microcomputer 108 controls the recording reproducing portion 104 to reproduce assigned image data in accordance with the Real PlayList on and after the next reproduction.

Moreover, when the result of the process at the step S1103 is no, the process shown in FIG. 11 is ended as it is. However, the cancellation may be recorded by rewriting the value vpl_auto of the name attribute value of the Virtual PlayList to be two. Then, it is also possible to deal with the Virtual PlayList similarly to the Virtual PlayList produced by the user and perform the control of the reproduction on the basis of the Virtual PlayList on and after the next reproduction.

Alternatively, the Virtual PlayList may be deleted.

When the Virtual PlayList produced by the series of processes is one produced automatically, the confirmation of editing is performed automatically. Then, it becomes possible to edit the Real PlayList and the moving image data when an execution requirement is generated by an operation of the user.

As described above, according to the present embodiment, a Virtual PlayList for assigning only the data areas in good photographing conditions according to the state at the time of photographing is produced, and image data is automatically edited on the Virtual PlayList at the time of a reproduction. Consequently, unnecessary parts can be deleted with a simple operation. Moreover, when a user judges that the data in the areas which are not assigned by the Virtual PlayList is necessary, there is no fear that the necessary parts are also deleted because no editing processes are performed.

Incidentally, in the present embodiment, the information related to the situation at the time of photographing such as camera-shake information and focusing information is used as the condition for judging the effective areas of the Virtual PlayList. On the other hand, many video cameras have been equipped with the functions of adding specific effects after photographing such as fade-in, fade-out and an image synthesizing function using a chroma key and a lumi key (hereinafter referred to as an "effect"). Moreover, such functions are intentionally executed by the operations of the user.

Figure 12:
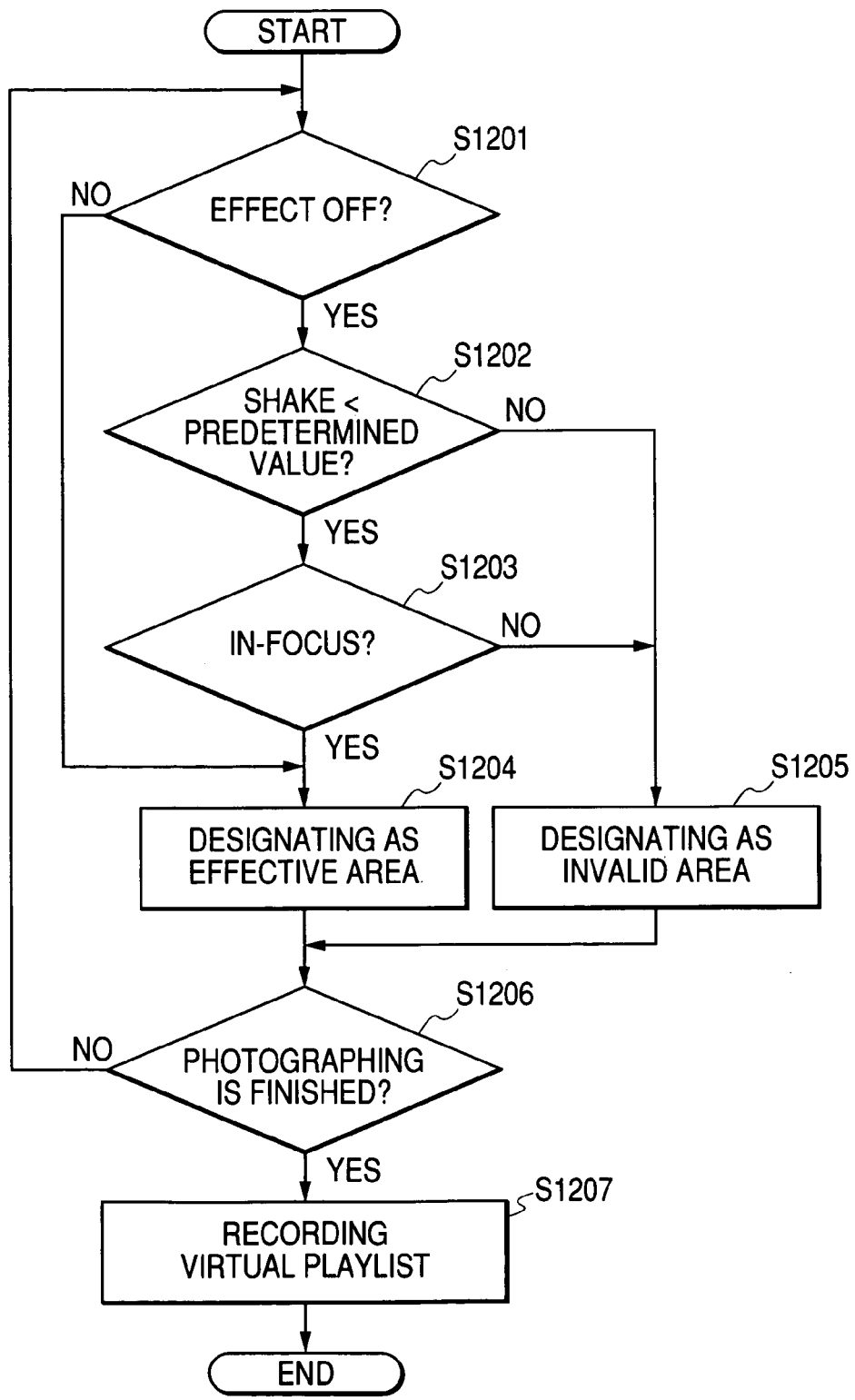
FIG. 12 is a flowchart showing a process at the time of recording.

Accordingly, during the period in which the effects mentioned above are used, automatically-generated Virtual PlayList may be judged to be in the effective area. The flowchart in which the process is added is shown in FIG. 12.

After a start of photographing, it is judged whether all of the functions of the effects are off or not (step S1201). In case of no at this step, namely when some effect function is effective by an operation of a user, the area is assigned as the effective area.

On the other hand, in case of yes at the step S1201, namely when all of the effect functions are off, the process proceeds to a step S1202, and the processes similar to those of the flowchart shown in FIG. 8 are executed after that.

Figure 13:
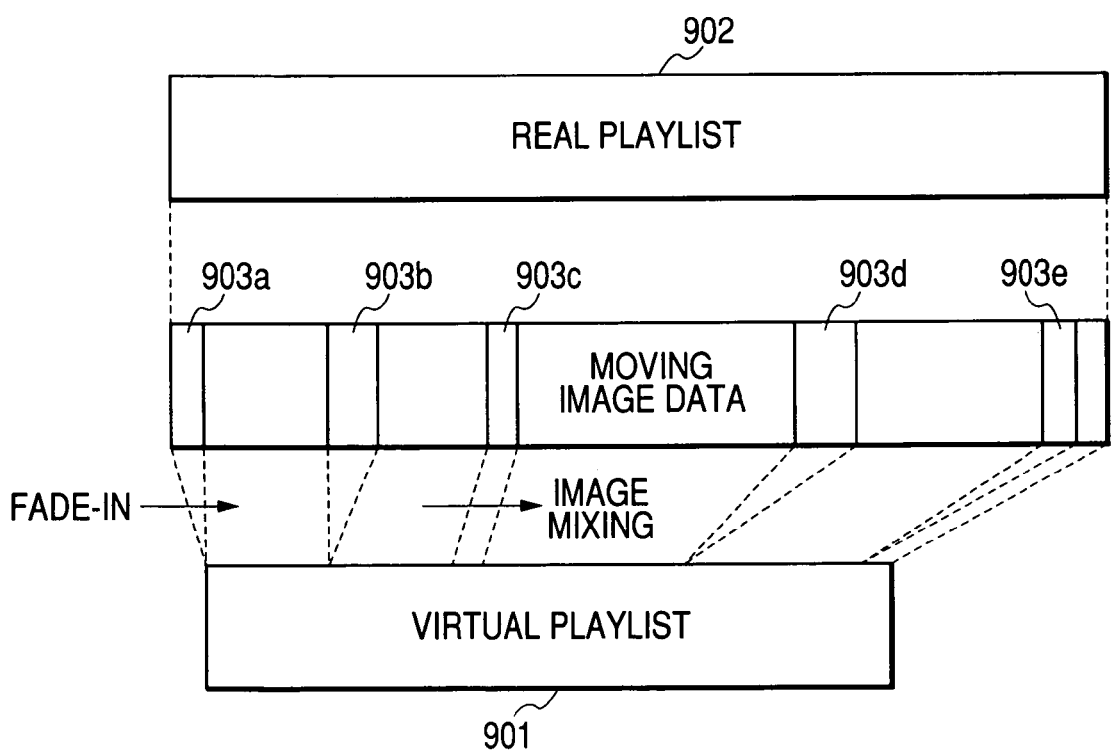
FIG. 13 is a view showing a relation among the management file, the playlist and the image data.

Moreover, relations among moving image data, a Real PlayList and a Virtual Playlist are shown in FIG. 13. The relations shown in FIG. 13 are similar to those illustrated with regard to FIG. 9, but an area 903a is being subjected to fade-in, and area 903c is being subjected to the mixing of images. Consequently, the two areas are assigned as the areas of the Virtual PlayList independently of the other conditions.

Incidentally, in the present embodiment, the camera-shake information and the focusing information are used for the judgment of an effective area or an invalid area. However, the other camera information may be used. For example, a posture detection sensor may be provided, and a judgment of an invalid area is performed when the photographing lens is facing to the ground for a predetermined period.

Moreover, although the camera-shake information is judged on the basis of the displacement magnitude of a video camera, a frequency characteristic may be added to the judgment algorism. For example, even if shakes to be applied to a video camera are small in amplitudes, when the applied shake has relatively high frequencies to produce an unsightly screen, the areas with the shakes may be designated as invalid areas. Furthermore, audio signals may be used for the judgment.

Moreover, although the embodiment described above edits the moving image data by using the Virtual PlayList produced automatically, but a Real PlayList or the moving image data may be edited by using a Virtual PlayList produced by the operations of a user. However, the present invention is characterized by executing the editing of the moving image data pertaining to only the moving image data file assigned in the Virtual PlayList.

Moreover, all of the areas assigned in the Virtual PlayList produced automatically are not reflected on the automatic editing, but the data in the areas other than the assigned areas in the parts assigned by the user may be deleted.

Moreover, the formats of the Virtual PlayLists and the Real PlayLists are only examples, and the formats are not limited to the exemplified ones. Binary structures may be adopted as long as a predetermined format related to the arrangement of data and the size of the data is regulated. Moreover, the management of the time codes is performed by the GOP, but the management is not limited to the method. Furthermore, the compression method of the contents is also only an example, and the other compression methods may be adopted. Furthermore, an optical disk is used as a recording medium, but a hard disk or a card type recording medium may be adopted.

Incidentally, the present invention may be applied to either a system composed of a plurality of pieces of equipment (such as a host computer, interface equipment, a reader, a printer and the like), or a system composed of a single piece of equipment (such as a copy machine, a facsimile machine or the like).

Moreover, it is needless to say that the object of the present invention may be achieved by providing a recording medium (or a storage medium) recording the program codes of the software implementing the functions of the embodiment described above to a system or an apparatus in order that the computer (or the CPU or the MPU) of the system or the apparatus may read the program codes stored in the recording medium to execute the read program codes. In this case, the program codes read from the recording medium, themselves, implement the functions of the embodiment described above, and then the recording medium recording the program codes constitutes the present invention. Moreover, the present invention includes not only the case where the functions of the embodiment described above are implemented by the execution of the read program codes by the computer, but also the case where a part or the whole of the actual processes are performed by an operating system (OS) working on the computer on the basis of the instructions of the program codes and the functions of the embodiment described above are implemented by the processes.

Furthermore, the present invention includes the case where the program codes read from the recording medium are written into the memory equipped in a function enhancement card inserted into the computer or a function enhancement unit connected to the computer before the CPU or the like mounted on the function enhancement card or in the function enhancement unit executes a part or the whole of an actual processes on the basis of the instructions of the program codes to implement the functions of the embodiment described above by the processes.

In the caser where the present invention is applied to the recording medium, the program codes corresponding to the flowcharts described above are stored in the recording medium.

What is claimed is:

1. A recording apparatus for recording information data on a recording medium, comprising:
   instruction means for instructing a start and a stop of recording;
   management information processing means for generating management information describing a reproducing procedure for reproducing a series of information data by designating positions of from a head to an end of the series of information data recorded on said recording medium during a period of from an instruction of a record start to an instruction of a record stop by said instruction means at time of a recording operation of the information data;
   playlist processing means for selecting a part of the series of information data in accordance with a predetermined condition at the time of the record operation of the information data to generate playlist information describing a reproducing procedure for reproducing the part of the information data; and
   recording means for recording the management information and the playlist information on said recording medium.

2. An apparatus according to claim 1, wherein
the management information and the playlist are described in a same syntax.

3. An apparatus according to claim 1, wherein
the playlist information is described by a data description language.

4. An apparatus according to claim 3, wherein
the data description language includes XML.

5. An apparatus according to claim 1, wherein
the predetermined condition is a condition pertaining to a state at time of recording the information data.

6. An apparatus according to claim 1, further comprising:
image pickup means for outputting moving image data,
wherein the information data includes the moving image data, and wherein said playlist processing means sets a state at time of photographing the moving image data as the predetermined condition.

7. An apparatus according to claim 6, wherein
said playlist processing means sets an amount of shakes of an object caused by said image pickup means as the predetermined condition.

8. An apparatus according to claim 6, wherein
said playlist processing means sets a focus condition of said image pickup means as the predetermined condition.

9. An apparatus according to claim 1, further comprising:
input means for inputting moving image data as the information data; and
image effect means for adding a video effect to the moving image data to output the effected moving image data to said recording means,
wherein said playlist processing means sets whether or not the moving image data includes the video effect by said image effect means, as the predetermined condition.

10. An apparatus according to claim 1, further comprising:

reproducing means for reproducing the information data, the management information and the playlist information from said recording medium,
wherein said management information processing means changes contents of the management information recorded on the recording medium on a basis of the playlist information.

11. An apparatus according to claim 10, wherein said management information processing means changes the contents of the management information so as to designate only a same part as a part designated by the playlist information in the series of information data.

12. An apparatus according to claim 11, wherein
said playlist processing means can produce first playlist information for designating the part of the information data selected in accordance with the predetermined condition, and second information data designating a part of the information data selected arbitrarily, and
wherein said management information processing means changes the contents of the management information on the basis of the first playlist information among the first playlist information and the second playlist information.

13. An apparatus according to claim 10, further comprising:
instruction means for arbitrarily instructing whether a change process of the management information is executed or not by said management information processing means.

14. A recording apparatus for recording information data on a recording medium, comprising:
instruction means for instructing a start and a stop of recording of the information data;
management information processing means for generating management information describing a reproducing procedure for reproducing a series of information data by designating positions of from a head to an end of the series of information data recorded on said recording medium during a period of from an instruction of a record start to an instruction of a record stop by said instruction means at time of a recording operation of the information data;
playlist processing means for designating a part of the series of information data to generate playlist information describing a reproducing procedure for reproducing the part of the information data; and
recording means for recording the management information and the playlist information on said recording medium.

15. An apparatus according to claim 14, further comprising:
reproducing means for reproducing the information data, the management information and the playlist information from said recording medium,
wherein said management information processing means changes contents of the management information recorded on the recording medium on a basis of the playlist information.

16. An apparatus according to claim 15, wherein said management information processing means changes the contents of the management information so as to designating only a same part as a part designated in the playlist information in the series of information data.

17. An imaging apparatus comprising:
image pickup means;
recording means for recording moving image data obtained by said image pickup means on a recording medium;
instruction means for instructing a start and a stop of recording; and
playlist processing means for generating playlist information describing a reproducing procedure for reproducing a part of series of moving image data recorded during a period of from an instruction of a record start to an instruction of a record stop by said instruction means at time of recording operation of the moving image data by selecting the part of the series of moving image data in accordance with a predetermined condition pertaining to a photographing operation of said image pickup means.

18. An apparatus according to claim 17, wherein said recording means records the series of moving image data on said recording medium as a file, and records the playlist information generated by said playlist processing means on said recording medium as a file different from the moving image data.

* * * * *

UNITED STATES PATENT AND TRADEMARK OFFICE
CERTIFICATE OF CORRECTION

PATENT NO. : 7,272,080 B2
APPLICATION NO. : 10/855372
DATED : September 18, 2007
INVENTOR(S) : Toshimichi Kudo It is certified that error appears in the above-identified patent and that said Letters Patent is hereby corrected as shown below:

COLUMN 1:
Line 17, "has" should read --have--.

COLUMN 2:
Line 28, "vide" should read --video--.

COLUMN 3:
Line 1, "generate-compressed" should read --generate compressed--.

COLUMN 4:
Line 25, "a audio" should read --audio--.
Line 41, "process of" should read --processes of--.
Line 66, "moving;the" should read --moving the--.

COLUMN 5:
Line 30, "data," should read --data--.

COLUMN 7:
Line 64, "characterize" should read --characterized.--.

COLUMN 8:
Line 57, "of." should read --of--.

COLUMN 9:
Line 35, "PlyaList" should read --PlayList--; and "i.e." should read --i.e.,--.
Line 44, "bases" should read --basis--.

COLUMN 12:
Line 3, "caser" should read --case--.

UNITED STATES PATENT AND TRADEMARK OFFICE
CERTIFICATE OF CORRECTION

PATENT NO. : 7,272,080 B2
APPLICATION NO. : 10/855372
DATED : September 18, 2007
INVENTOR(S) : Toshimichi Kudo It is certified that error appears in the above-identified patent and that said Letters Patent is hereby corrected as shown below:

<u>COLUMN 14</u>:
Line 17, "designating" should read --designate--.

Signed and Sealed this

Eighth Day of April, 2008

JON W. DUDAS
*Director of the United States Patent and Trademark Office*